United States Patent
Brick (10) Patent No.: US 8,998,435 B2
(45) Date of Patent: Apr. 7, 2015

(54) LIGHTING DEVICE

(75) Inventor: Peter Brick, Regensburg (DE)

(73) Assignee: OSRAM Opto Semiconductors GmbH, Regensburg (DE)

( * ) Notice: Subject to any disclaimer, the term of this patent is extended or adjusted under 35 U.S.C. 154(b) by 0 days.

(21) Appl. No.: 14/000,862

(22) PCT Filed: Jan. 26, 2012

(86) PCT No.: PCT/EP2012/051242
§ 371 (c)(1),
(2), (4) Date: Oct. 23, 2013

(87) PCT Pub. No.: WO2012/113603
PCT Pub. Date: Aug. 30, 2012

(65) Prior Publication Data
US 2014/0049943 A1   Feb. 20, 2014

(30) Foreign Application Priority Data

Feb. 24, 2011 (DE) .......................... 10 2011 012 297

(51) Int. Cl.
| | | |
|---|---|---|
| *G09F 13/04* | (2006.01) | |
| *F21V 13/12* | (2006.01) | |
| *F21V 8/00* | (2006.01) | |
| *G02B 19/00* | (2006.01) | |
| *F21V 33/00* | (2006.01) | |

(52) U.S. Cl.
CPC .............. *F21V 13/12* (2013.01); *G02B 6/0028* (2013.01); *G02B 19/0066* (2013.01); *G02B 19/0028* (2013.01); *G02B 19/0061* (2013.01); *F21V 33/0052* (2013.01)

(58) Field of Classification Search
CPC ...... F21V 13/12; G02B 9/0061; G02B 9/0066
USPC ............... 362/97.1, 97.3, 19, 84, 235; 353/20
See application file for complete search history.

(56) References Cited

U.S. PATENT DOCUMENTS

| | | | |
|---|---|---|---|
| 5,144,498 A | 9/1992 | Vincent | |
| 6,332,688 B1 * | 12/2001 | Magarill | .................. 359/858 |
| 7,445,340 B2 * | 11/2008 | Conner et al. | .................. 353/20 |
| 2007/0146639 A1 | 6/2007 | Conner | |
| 2010/0208041 A1 | 8/2010 | Savvateev et al. | |

FOREIGN PATENT DOCUMENTS

| | | |
|---|---|---|
| CN | 1555509 A | 12/2004 |
| CN | 1841183 A | 10/2006 |
| CN | 101361022 A | 2/2009 |
| DE | 3826330 A1 | 2/1990 |
| DE | 10314524 A1 | 10/2004 |
| EP | 1708513 A2 | 10/2006 |

(Continued)

OTHER PUBLICATIONS

"Dolby 3D—Wikipedia, the free encyclopedia", http://en.wikipedia.org/w/index.php?title=Dolby_3D&oldid=540792050, Feb. 27, 2013, pp. 1-2.

*Primary Examiner* — Ali Alavi
(74) *Attorney, Agent, or Firm* — McDermott Will & Emery LLP (57) ABSTRACT

The invention relates to a lighting device (10), comprising a multistage lens (1, 2, 3), which spectrally and spatially collimates the transmitted light (5, 6). The illumination device is particularly well suited for use in a display unit.

16 Claims, 4 Drawing Sheets (56) References Cited

FOREIGN PATENT DOCUMENTS

| | | |
|---|---|---|
| EP | 2113951 A1 | 11/2009 |
| KR | 1020080083180 | 9/2008 |
| TW | 204006 | 4/1993 |
| WO | 02/086617 A2 | 10/2002 |
| WO | 2010/076103 A2 | 7/2010 |
| WO | WO-2012113603 A1 | 8/2012 |

* cited by examiner

LIGHTING DEVICE

The document WO 2010/076103 A2 describes a lighting device.

One object to be achieved consists in specifying a lighting device having a particularly narrowband spectral emission.

In accordance with at least one embodiment of the lighting device, the lighting device comprises a light source, which comprises at least one light-emitting diode chip. In this case, the light source generates light during operation. The at least one light-emitting diode chip is the light-generating element of the light source. The light source can generate colored, multicolored or white light, for example. For this purpose, the light source can comprise light-emitting diode chips of the same type or else different light-emitting diode chips, which generate light of different colors during operation.

In accordance with at least one embodiment of the lighting device, the lighting device comprises a first optical element which collimates the transmitted light of the light source into a predefinable angular range.

By way of example, the first optical element is a so-called optical concentrator. The optical concentrator can be for example a parabolic optical concentrator, an elliptical optical concentrator or a hyperbolic optical concentrator.

Furthermore, it is possible for the first optical element to be constructed from combinations of said optical concentrators, such that, by way of example, a first section of the first optical element is embodied as a parabolic optical concentrator and an adjacent second section is embodied as a hyperbolic optical concentrator.

The first optical element can also be a lens. Furthermore, it is possible for the first optical element to comprise a lens. For example, the first optical element is then formed by the combination of a reflective optical element with a lens.

In this case, the first optical element collimates the transmitted light of the light source in a predefinable angular range, such that a light beam composed of light of the light source has for example a predefinable aperture angle after leaving the first optical element. In this way, the first optical element reduces the divergence of the transmitted light. In particular, the first optical element is embodied as quadrant-symmetrical or, in particular, rotationally symmetrical with respect to a main direction of extent.

In accordance with at least one embodiment of the lighting device, the lighting device comprises a second optical element, which reflects back to the light source light of the light source which at least initially does not enter into the first optical element. That is to say that light of the light source which is not radiated into the first optical element because, for example, it moves past a light entrance side of the first optical element is reflected back from the second optical element to the light source. There said light can be reflected for example at components of the light source such as, for instance, a carrier or the at least one light-emitting diode chip. The light is then reflected back for example in the direction of the first optical element and, if appropriate, enters into the first optical element there. Furthermore, it is possible for the light to penetrate into the at least one light-emitting diode chip and to be used there for generating light by means of so-called "photon recycling".

In accordance with at least one embodiment of the lighting device, the lighting device comprises a third optical element, which reduces the spectral bandwidth of transmitted light of the light source at least in places. In this case, a reduction of the spectral bandwidth should also be understood to mean that the rising and falling edges of a peak in the spectral distribution are cut off. This can be effected by means of a bandpass filter, for example.

The light generated by a monochromatic light-emitting diode chip usually has a spectral full width at half maximum of between 20 nm and 40 nm. The third optical element can reduce this spectral full width at half maximum. If the light-emitting diode chip is for example a light-emitting diode chip which generates white light, it is possible for the third optical element to reduce the spectral bandwidth of the transmitted light at difference places. Thus, the wide spectrum of the white light can be narrowed for example by means of the third optical element to form a spectrum having a narrow peak for example in the range of blue light and a narrow peak for example in the range of yellow light.

In this way, the third optical element reduces the spectral bandwidth of the transmitted light of the light source at least in places.

In accordance with at least one embodiment of the lighting device, the first optical element has a light entrance side facing the light source. At least part of the light of the light source at the light entrance side then enters into the first optical element. By way of example, the first optical element has at the light entrance side an opening, particularly if the first optical element is embodied as a reflectively coated hollow body, or a light entrance area, if the first optical element is for example a solid body formed with a transparent material. In the first case, the first optical element can be for example a CPC (compound parabolic concentrator) reflector having parabolically shaped outer areas which are reflectively coated in a metallic fashion, for example, at their inner side. In the second case, this can involve for example a CPC with a conical section which is formed with a transparent material such as glass, PC, PMMA or some other plastic.

In accordance with at least one embodiment of the lighting device, the second optical element surrounds the light entrance side of the first optical element completely in particular in lateral directions, in such a way that at least a large part of the light of the light source which does not enter into the first optical element impinges on the second optical element. In this case, the lateral directions are those directions which run for example parallel to a radiation exit area of the at least one light-emitting diode chip. In other words, the the second optical element laterally completely surrounds the light entrance side of the first optical element.

Here and hereinafter, a "large part" of the light denotes more than 50 percent of the light, in particular more than 75 percent of the light of the light source. In the ideal case, the entire light of the light source which does not enter into the first optical element is reflected from the second optical element, that is to say that the entire light which is not coupled in impinges on the second optical element. For this purpose, the second optical element can surround the light entrance side of the first optical element completely in lateral directions in a frame- or ring-like manner.

In accordance with at least one embodiment of the lighting device, the third optical element is arranged at a light exit side of the first optical element facing away from the light entrance side. The light exit side of the optical element is that side at which the light which has passed through the first optical element emerges again from the latter. By way of example, the light exit side can comprise a light exit opening or be formed with a light exit area. In accordance with at least one embodiment of the lighting device, at least a large part of the light emerging from the light exit side of the first optical element passes through the third optical element, ideally all light emerging from the light exit side. For this purpose, the third optical element can be in direct contact with the first optical element for example at the light exit side. In accordance with at least one embodiment of the lighting device, the lighting device comprises a light source, which comprises at least one light-emitting diode chip and generates light during operation, a first optical element, which collimates the transmitted light of the light source in a predefinable angular range, a second optical element, which reflects back to the light source light of the light source which at least initially does not enter into the first optical element, and a third optical element, which reduces the spectral bandwidth of transmitted light of the light source at least in places. In this case the first optical element has a light entrance side facing the light source, at least part of the light of the light source enters into the first optical element at the light entrance side, the second optical element at least laterally completely surrounds the light entrance side of the first optical element, at least a large part of the light of the light source which does not enter into the first optical element impinges on the second optical element, and the third optical element is arranged at a light exit side of the first optical element facing away from the light entrance side, wherein at least a large part of the light emerging from the light exit side of the first optical element passes through the third optical element. The lighting device described here makes it possible, in particular, to generate spectrally narrowband light in a narrow angular range. In this case, the lighting device is based inter alia on the following consideration:

a light-emitting diode chip of the light source has a high etendue. By way of example, the etendue $E=\Pi\times(\sin 90°)^2\times$ (light exit area of the light-emitting diode chip). Given a light exit area of one square millimeter, the etendue is therefore approximately 3.14.

A third optical element, which reduces the spectral bandwidth of transmitted light of the light source at least in places, for example an interference filter, has a limited etendue of $E=\Pi\times(\sin \alpha)^2\times$(area content of the light entrance area of the filter).

In this case, $\alpha$ is the maximum light entrance angle at which light impinges on the light entrance area of the third optical element. If $\alpha$ is 15°, for example, and the light entrance area of the filter is 16 square millimeters, then the etendue is $1.07\times\Pi$, that is to say approximately 3.4.

Such an arrangement therefore operates very near to the etendue limit. Accordingly, it is difficult to guide light generated by the at least one light-emitting diode chip of the light source during operation through the third optical element. For this purpose, one would need for example a first optical element, which collimates the transmitted light of the light source in a predefinable angular range, wherein the desired maximum angle at which light impinges on the light entrance area of the third optical element is the target angle. It then holds true that $a_1\times\sin 90°=a_2\times\sin$ (target angle). In this case, a1 is for example half the diameter of a light entrance area or light entrance opening of the first optical element embodied for example as a CPC, and a2 is half the diameter of the light exit opening or of the light exit area of said first optical element. Under the condition that a1 should be chosen to be greater than the side length of, for example, a light-emitting diode chip of the light source downstream of which the first optical element is disposed, difficulties arise particularly for relatively large light-emitting diode chips. It therefore appears necessary to couple the highest possible proportion of the light generated by the light source during operation into the first optical element. This can be achieved in the case of a present lighting device for example by means of the second optical element, which reflects back to the light source light of the light source which at least initially does not enter into the first optical element, by virtue of the fact that this reflection-back gives the light a further possibility for entrance into the first optical element.

In accordance with at least one embodiment of the lighting device, the third optical element comprises an interference filter or is formed by an interference filter. Interference filters are particularly well suited to reducing the spectral bandwidth of the transmitted light. With the use of interference filters, however, the problem occurs that the filter effect is greatly dependent on the angle of incidence of the transmitted radiation. The first optical element advantageously leads to reduced angles of incidence, such that the third optical element embodied as an interference filter can reduce the spectral bandwidth in a predefinable manner.

An interference filter is furthermore distinguished by the fact that no absorption of light takes place at said filter. Portions of the light which do not pass through the interference filter are reflected and can pass for example through the first optical element to the at least one light-emitting diode chip of the light source, where said portions can be reused by means of photon recycling. By way of example, the interference filter is a bandpass filter having steep edges. The interference filter can be formed for example by a layer which can be applied directly to an outer area of the first optical element at the light exit side thereof. It is also possible to apply the layer to some other component of the lighting device. By way of example, the layer is a dielectric layer sequence. The interference filter can alternatively also be applied to a carrier plate, for example composed of glass, which is disposed downstream of the light exit side of the first optical element.

In accordance with at least one embodiment of the lighting device, the light source generates white or multicolored light and the third optical element has at least two transmission bands. By way of example, the light source generates light having portions of red, green and blue light. The third optical element can then have three transmission bands, for example, in which spectrally narrowband red, blue and green light is transmitted. The non-transmitted portion of the light can be reflected back to the light source.

In accordance with at least one embodiment of the lighting device, the first optical element collimates in particular a large part of the transmitted light of the light source in an angular range of at most plus/minus 15°. In this case, the light from the first optical element impinges on the third optical element at an angle of incidence of at most 15°. Such small angles of incidence prove to be advantageous particularly when the third optical element comprises an interference filter or is formed by an interference filter.

In accordance with at least one embodiment of the lighting device, the third optical element narrows the spectrum of the transmitted light of the light source at least in places to form a peak having a spectral bandwidth of at most 10 nm. The spectral bandwidth is measured for example on the basis of the full width at half maximum of a peak in which the light intensity is plotted against the wavelength.

In accordance with at least one embodiment of the lighting device, the light source generates white or multicolored light and the third optical element comprises at least two transmission bands, wherein the number of peaks of the light filtered by the third optical element corresponds to the number of transmission bands. By way of example, each peak then has a spectral bandwidth of at most 10 nm. In this case, it is possible for a peak to be composed of a plurality of peaks.

In accordance with at least one embodiment of the lighting device, the second optical element is designed to reflect impinging light in a directional manner. By way of example, for this purpose the second optical element can comprise a specularly reflective metal layer facing the light source. Light which then does not enter into the first optical element at a light entrance side, but rather impinges on the second optical element, is reflected back in a directional manner in the direction of the light source.

In accordance with at least one embodiment of the lighting device, the second optical element is in direct contact with an outer area of the first optical element in places. The second optical element can be embodied for example in the form of a truncated hollow cone or truncated hollow pyramid, wherein the base area of these geometrical elements has, in particular, the same form as a light entrance area or a light entrance opening at the light entrance side of the first optical element. With its side facing the first optical element, the optical element is then in direct contact with the outer area of the first optical element in places. In this case, the connection between second optical element and first optical element can be chosen in such a way that no light can escape between the first optical element and the second optical element, that is to say that in this case there is an interruption-free connection between the two optical elements. At its side facing the light source, the second optical element can be for example in direct contact with a component of the light source, for example a carrier for the at least one light-emitting diode chip. In this way, the second optical element completely surrounds the interspace between the light source and the first optical element. In this way, no light can pass toward the outside, since, if it has been emitted by at least one light-emitting diode chip, it either enters into the first optical element or is reflected by the second optical element. In other words, the second optical element then forms a light box having the light source and the first optical element, respectively, at two opposite sides.

Furthermore, a display device is specified.

In accordance with at least one embodiment of the display device, the display device comprises at least one lighting device described here. That is to say that all features specified for the lighting device are also disclosed for the display device. Furthermore, the display device comprises an imaging element, which is backlit or illuminated by the light of the at least one lighting device. The imaging element can be for example an LCD display or a micromirror array. The display device can then be for example a screen or a projection device.

On account of the spectrally narrowband emission of the lighting device, such a display device is particularly suited to the coding of information about wavelength and thus in particular to 3D representation. That is to say that the display device described here is particularly suited to 3D representation, in particular for methods based on multiwave triplets, such as, for example, the "Dolby 3D" method from "Dolby".

In accordance with at least one embodiment of the display device, the display device comprises at least one optical waveguide, wherein the light of the at least one lighting device at least for the most part enters into the optical waveguide and light of the at least one lighting device which emerges from the optical waveguide backlights the imaging element. That is to say that, in the case of a display device embodied in this way, for example an LCD display as imaging element is not directly backlit by the lighting device, rather the light firstly enters into a large-area optical waveguide, which then in turns backlights the imaging element.

In accordance with at least one embodiment of a display device described here, the imaging element is formed by the at least one lighting device. By way of example, the display device comprises a multiplicity of lighting devices, wherein each lighting device is assigned to a pixel of the image to be generated.

In accordance with at least one embodiment of the display device, the display device comprises at least two lighting devices which generate light of the same color, wherein the wavelength of the maximum intensity of the light of the lighting devices differs from one another, in particular by at least 10 nm. That is to say that the lighting device generates for example two types of red light, wherein the peaks of maximum intensity of this light are slightly shifted relative to one another. Such a display device is then particularly suited to 3D representation since different partial images for the left and right eyes are coded by wavelengths that are slightly shifted with respect to one another. In order to obtain a three-dimensional image, glasses comprising interference filters are then used, for example. By way of example, the image information for the left eye is generated by red light having a peak maximum at 629 nm, green light having a peak maximum at 532 nm and blue light having a peak maximum at 446 nm. The image for the right eye is then generated from red light having a peak wavelength at 615 nm, green light at a peak wavelength at 518 nm and blue light at a peak wavelength of 432 nm. The channel separation of the image is effected by means of selective interference filters which filters out the appropriate wavelength triplet for each eye.

The lighting device described here and the display device described here are explained in greater detail below on the basis of exemplary embodiments and the associated figures.

Elements that are identical, of identical type or act identically are provided with the same reference signs in the figures. The figures and the size relationships of the elements illustrated in the figures among one another should not be regarded as to scale. Rather, individual elements may be illustrated with an exaggerated size in order to enable better illustration and/or in order to afford a better understanding.

Figure 1:
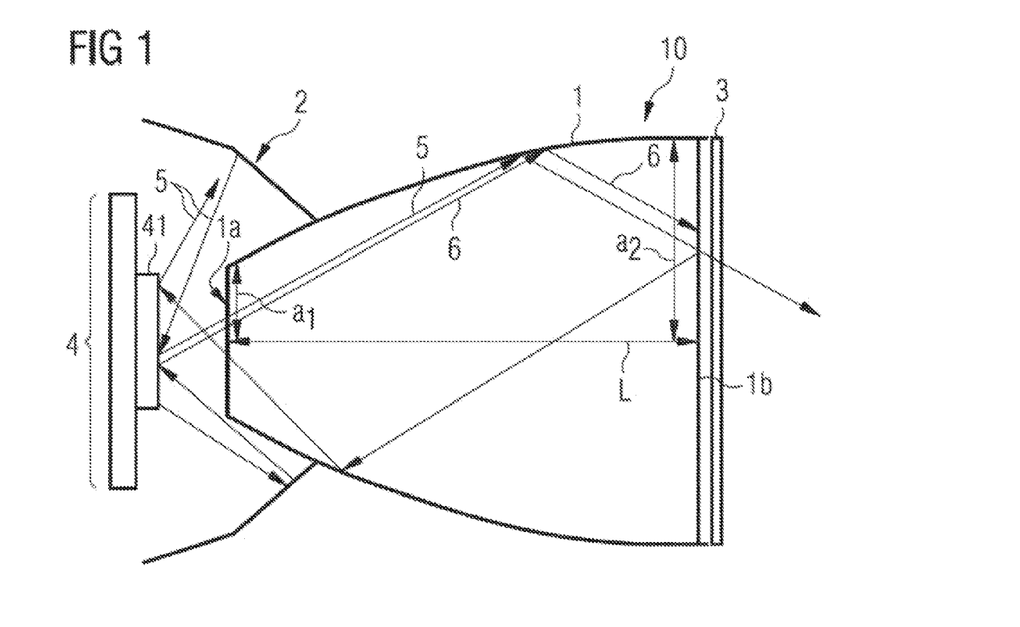
FIG. 1 shows an exemplary embodiment of a lighting device described here, in a schematic sectional illustration.

FIG. 1 shows an exemplary embodiment of a lighting device described here. The lighting device comprises a light source 4. The light source 4 comprises at least one light-emitting diode chip 41. In this case, the light source 4 can also comprise a plurality of light-emitting diode chips 41, which can be suitable for example for generating light of different colors. A first optical element 1 is disposed downstream of the light-emitting diode chips 41 of the light source 4. In the present case, the first optical element 1 is embodied as a compound parabolic concentrator (CPC), for example in the form of a reflectively coated hollow body. At the light entrance side 1a, the first optical element 1 has a light entrance opening having a diameter of 2×a1, which is greater than the light exit area of the light-emitting diode chip 41 facing the first optical element or—in the case of a plurality of light-emitting diode chip 41—greater than the sum of the light exit areas.

Light 5, 6 originating from the light-emitting diode chip 41 is collimated upon passing through the first optical element 1, in such a way that after passing through it forms a beam cone having an aperture angle of a maximum of plus/minus 15°. In this case, the light occurs at the light exit side 1b for example from a light exit opening having a diameter of 2×a2.

Part of the light of the light-emitting diode chip 41 does not enter into the first optical element 1. This light is reflected back from the second optical element 2 to the light source 4, where it impinges for example on the light-emitting diode chip 41 and is reflected from there once again in the direction of the first optical element 1.

The second optical element 2 is in direct contact with an outer area of the first optical element 1 and laterally completely surrounds the first optical element 1 at its light entrance side 1a. By way of example, the areas of the second optical element which face the light source 4 are embodied as directionally reflective. In this case, it is possible for the second optical element to completely close off the cavity between the light source 4 and the first optical element (in this respect, cf. for example FIG. 3), such that no light of the light-emitting diode chip 41 can pass toward the outside other than at the light exit side 1b of the first optical element 1

The lighting device furthermore comprises a third optical element 3, which is embodied as an interference filter in the present case. By way of example, the interference filter is embodied as a dielectric layer sequence on a carrier plate, which can be for example in direct contact with the first optical element 1 at the light exit side 1b. For the case where the first optical element 1 is embodied as a solid body, the third optical element 3 can be applied for example as a layer to the first optical element 1 also directly at the light exit side 1b.

The light reflected from the second optical element 2 to the light-emitting diode chip 41 is reflected there for example at the outer area of the light-emitting diode chip diffusely, such that there is an increased probability that said light can enter into the first optical element 1.

Figure 2:
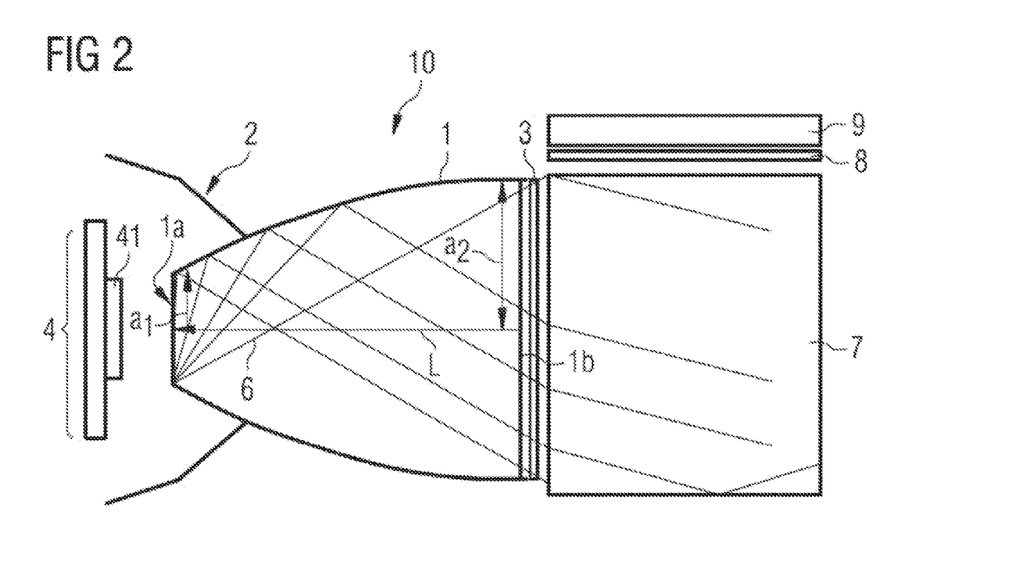
FIGS. 2, 3, 4 and 5 show exemplary embodiments of display devices described here, in schematic sectional illustrations.

A first exemplary embodiment of a display device described here is explained in greater detail in conjunction with FIG. 2. The display device comprises a lighting device as explained in greater detail in conjunction with FIG. 1. An optical waveguide 7 is arranged at the light exit side 1b of the first optical element 1 of the lighting device. The light of the lighting device is coupled into the optical waveguide at an edge. From the optical waveguide 7, the light passes through the diffuser 8, which provides for a homogenization of the emerging light, and then impinges for example on an LCD panel, which constitutes the imaging element 9.

Figure 3:
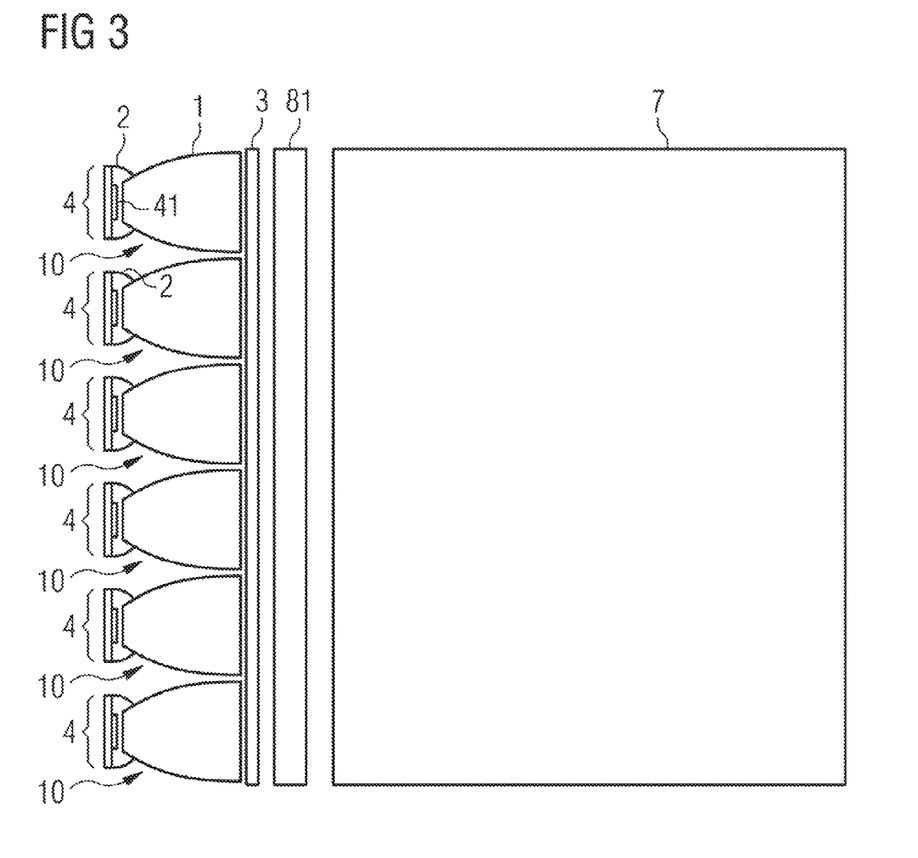

A further exemplary embodiment of a display device described here is explained in greater detail in conjunction with FIG. 3. In contrast to the display device described in conjunction with FIG. 2, in this exemplary embodiment a mixing optical unit 81, which is optional, is arranged between the multiplicity of lighting devices 10 and the planar optical waveguide 7. An illustration of the imaging element 9 is omitted in the present case for reasons of clarity. The lighting devices 10 can in this case generate monochromic light of different colors and different wavelengths. By way of example, the lighting devices generate light of two different red shades, two different green shades two different blue shades. For this purpose, different filters for generating spectrally particularly narrowband light can be disposed downstream of the lighting devices 10. It is also possible to use white light having a different composition or multicolored light having a different composition. Thus, different lighting devices 10 can generate different red and different mint shades, for example.

As illustrated in FIG. 3, the filters for the individual lighting devices can in this case be arranged on a common carrier plate. Alternatively, it is possible for the filters to be embodied as layers on one of the other components of the display device such as, for example, the mixing optical unit 81, the radiation entrance area of the optical waveguide 7 or at the light exit side 1b on the first optical elements 1 of the lighting devices 10.

Figure 4:
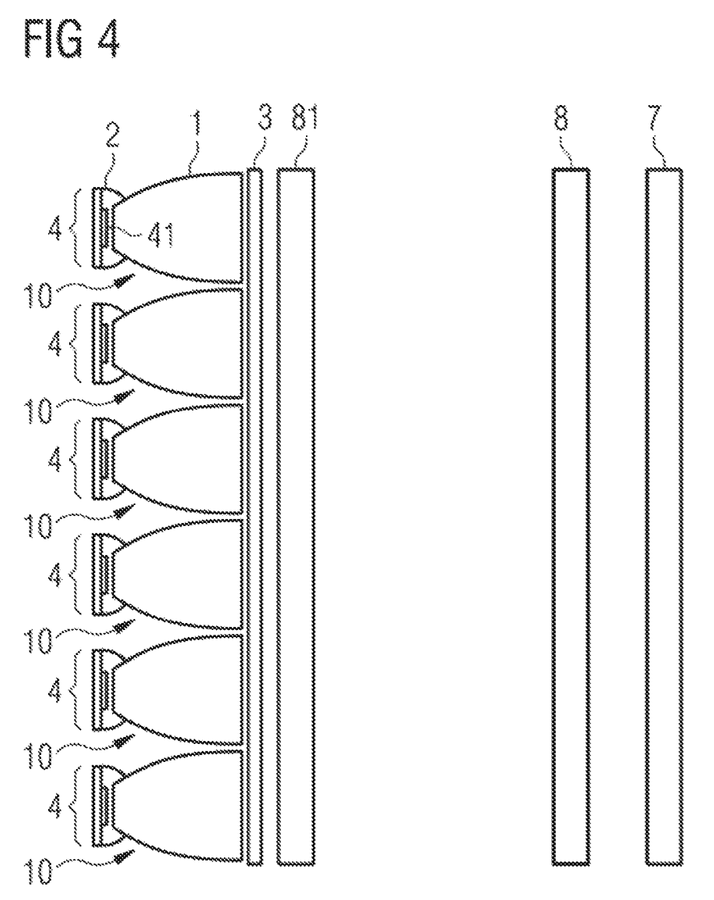

In contrast to FIG. 3, FIG. 4 shows a display device in which an optical waveguide 7 is dispensed with and the imaging element 9 is illuminated directly by the light of the lighting devices. The use of a mixing optical unit 81 or of a diffuser 8 is in each case optional here.

Figure 5:
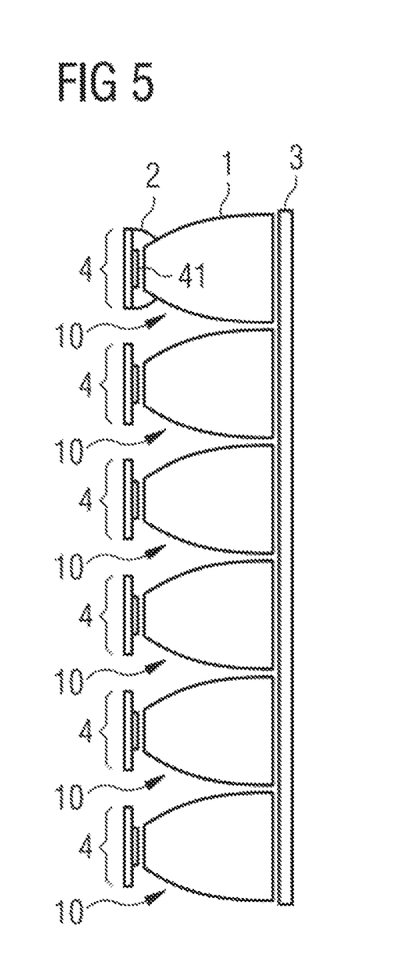

A display device in which the imaging element is dispensed with is described in conjunction with FIG. 5. Here the lighting devices 10 are themselves used as imaging elements. By way of example, the lighting devices 10, as described above, can be assigned to individual pixels of an image to be generated.

Overall, the lighting device described here, on account of the narrowband emission of the light, is particularly suited to specific 3D representation techniques for generating moving and still three-dimensional images. However, it is also possible for a lighting device described here to prove to be advantageous in other fields of use such as, for example, general lighting for particularly true-color illumination of spaces or articles.

The invention is not restricted to the exemplary embodiments by the description on the basis of said exemplary embodiments. Rather, the invention encompasses any novel feature and also any combination of features, which in particular includes any combination of features in the patent claims, even if this feature or this combination itself is not explicitly specified in the patent claims or exemplary embodiments.

This patent application claims the priority of German patent application 102011012297.4, the disclosure content of which is hereby incorporated by reference.

The invention claimed is:

1. A lighting device comprising:
    a light source, which comprises at least one light-emitting diode chip and generates light during operation;
    a first optical element, which collimates the transmitted light of the light source in a predefinable angular range;
    a second optical element, which reflects back to the light source light of the light source which at least initially does not enter into the first optical element; and
    a third optical element, which reduces the spectral bandwidth of transmitted light of the light source at least in places,
    wherein:
        the first optical element has a light entrance side facing the light source,
        at least part of the light of the light source enters into the first optical element at the light entrance side,
        the second optical element laterally completely surrounds the light entrance side of the first optical element,
        at least a large part of the light of the light source which does not enter into the first optical element impinges on the second optical element,
        the third optical element is arranged at a light exit side of the first optical element facing away from the light entrance side, and
        at least a large part of the light emerging from the light exit side of the first optical element passes through the third optical element.

2. The lighting device according to claim 1, wherein the third optical element comprises an interference filter or is an interference filter, and
    wherein the first optical element collimates the transmitted light of the light source in an angular range of at most +/−15°.

3. The lighting device according to claim 2, wherein:
the third optical element is embodied as a layer applied directly to an outer area of the first optical element at the light exit side thereof,
the light source generates white or multicolored light and the third optical element has at least two transmission bands,
the third optical element narrows the spectrum of the transmitted light of the light source at least in places to form a peak having a spectral bandwidth of at most 20 nm, in particular at most 10 nm,
the number of peaks corresponds to the number of transmission bands,
the second optical element reflects impinging light in a directional manner, and
the second optical element is in direct contact with an outer area of the first optical element in places.

4. The lighting device according to claim 1, wherein the third optical element comprises an interference filter or is an interference filter.

5. The lighting device according to claim 1, wherein the third optical element is embodied as a layer applied directly to an outer area of the first optical element at the light exit side thereof.

6. The lighting device according to claim 1, wherein the light source generates white or multicolored light and the third optical element has at least two transmission bands.

7. The lighting device according to claim 1, wherein the first optical element collimates the transmitted light of the light source in an angular range of at most +/−15°.

8. The lighting device according to claim 1, wherein the third optical element narrows the spectrum of the transmitted light of the light source at least in places to form a peak having a spectral bandwidth of at most 20 nm, in particular at most 10 nm.

9. The lighting device according to claim 1, wherein the light source generates white or multicolored light and the third optical element has at least two transmission bands, and
wherein the number of peaks corresponds to the number of transmission bands.

10. The lighting device according to claim 1, wherein the second optical element reflects impinging light in a directional manner.

11. The lighting device according to claim 1, wherein the second optical element is in direct contact with an outer area of the first optical element in places.

12. A display device comprising:
at least one lighting device according to claim 1, and
an imaging element, which is backlit or illuminated by light of the at least one lighting device.

13. The display device according to claim 12, comprising at least one optical waveguide, wherein the light of the at least one lighting device at least for the most part enters into the optical waveguide and light of the at least one lighting device which emerges from the optical waveguide backlights the imaging element.

14. A display device comprising:
at least one lighting device according to any of the preceding claims, wherein an imaging element is formed by the at least one lighting device.

15. The display device according to claim 14, wherein at least two of the lighting devices generate light of the same color, and
wherein the wavelength of the maximum intensity of the light of the lighting devices differ from one another, in particular by at least 10 nm.

16. A lighting device comprising:
a light source, which comprises at least one light-emitting diode chip and generates light during operation;
a first optical element, which collimates the transmitted light of the light source in a predefinable angular range;
a second optical element, which reflects back to the light source light of the light source which at least initially does not enter into the first optical element;
a third optical element, which reduces the spectral bandwidth of transmitted light of the light source at least in places,
wherein:
the first optical element has a light entrance side facing the light source,
at least part of the light of the light source enters into the first optical element at the light entrance side,
the second optical element laterally completely surrounds the light entrance side of the first optical element,
at least a large part of the light of the light source which does not enter into the first optical element impinges on the second optical element,
the third optical element is arranged at a light exit side of the first optical element facing away from the light entrance side,
at least a large part of the light emerging from the light exit side of the first optical element passes through the third optical element, and
the third optical element narrows the spectrum of the transmitted light of the light source at least in places to form a peak having a spectral bandwidth of at most 20 nm.

* * * * *